United States Patent
Lee et al.

(10) Patent No.: US 8,180,195 B2
(45) Date of Patent: May 15, 2012

(54) MEMORY STRUCTURES AND METHODS FOR VIDEO CODEC

(75) Inventors: Yong-Mi Lee, Suwon-si (KR); Jung-Sun Kang, Seongnam-si (KR)

(73) Assignee: Samsung Electronics Co., Ltd., Gyeonggi-Do (KR)

( * ) Notice: Subject to any disclaimer, the term of this patent is extended or adjusted under 35 U.S.C. 154(b) by 1109 days.

(21) Appl. No.: 12/071,857

(22) Filed: Feb. 27, 2008

(65) Prior Publication Data

US 2008/0205858 A1    Aug. 28, 2008

(30) Foreign Application Priority Data

Feb. 27, 2007  (KR) .................. 10-2007-0019790

(51) Int. Cl.
*H04N 7/12* (2006.01)

(52) U.S. Cl. .............. 386/244; 375/240.02; 375/240.16; 375/240.24; 375/240.26; 375/240.29; 348/402.1; 386/356

(58) Field of Classification Search .................. 386/124, 386/244, 356; 375/240.16, 240.24, 240.02, 375/240.26, 240.29; 348/402.1
See application file for complete search history.

(56) References Cited

U.S. PATENT DOCUMENTS

| | | | |
|---|---|---|---|
| 6,188,728 B1* | 2/2001 | Hurst .................. | 375/240.16 |
| 2002/0159644 A1* | 10/2002 | Sakuyama .................. | 382/240 |
| 2004/0066854 A1* | 4/2004 | Hannuksela .................. | 375/240.27 |
| 2004/0258153 A1* | 12/2004 | Linzer .................. | 375/240.16 |
| 2005/0175091 A1* | 8/2005 | Puri et al. .................. | 375/240.03 |
| 2005/0276329 A1* | 12/2005 | Adiletta et al. .................. | 375/240.16 |
| 2007/0110158 A1* | 5/2007 | Maeda .................. | 375/240.16 |
| 2007/0153897 A1* | 7/2007 | Yan .................. | 375/240.16 |
| 2007/0160153 A1* | 7/2007 | Sullivan .................. | 375/240.29 |
| 2008/0043842 A1* | 2/2008 | Nakaishi .................. | 375/240.16 |
| 2008/0089426 A1* | 4/2008 | Wang .................. | 375/240.24 |
| 2008/0130742 A1* | 6/2008 | Scheuermann .................. | 375/240.02 |

FOREIGN PATENT DOCUMENTS

| | | |
|---|---|---|
| JP | 06-028890 | 2/1994 |
| JP | 09-172601 A | 6/1997 |
| JP | 11-306755 | 11/1999 |
| KR | 10-1999-0060797 A | 7/1999 |
| KR | 100246738 | 12/1999 |
| KR | 1020020095755 | 12/2002 |
| KR | 10-2004-0082601 A | 9/2004 |
| WO | WO 03/107681 A2 | 12/2003 |

* cited by examiner

*Primary Examiner* — Thai Tran
*Assistant Examiner* — Gary Gracia
(74) *Attorney, Agent, or Firm* — Harness, Dickey & Pierce, PLC

(57) ABSTRACT

A memory device for storing a plurality of macroblocks may include a plurality of memory banks. Each macroblock may include m*n pixel data, wherein m is a positive integer, and wherein n also is a positive integer. The plurality of memory banks is adapted to store the pixel data, and wherein each memory bank is sized to store rows of m pixel data. An image processing system may include: a memory adapted to store a plurality of macroblocks; and a video codec. The memory may include a plurality of memory banks. Each memory bank may be sized to store rows of m pixel data. The video codec may be adapted to encode pixel data read from the memory. The video codec also may be adapted to decode the pixel data read from the memory.

28 Claims, 5 Drawing Sheets

Fig. 2B

|  | B1 | B2 | B3 | B4 | 100 |
|---|---|---|---|---|---|
|  | 0 MB_0 255 | 0 MB_1 | 0 MB_2 | 0 MB_3 | |
|  | 256 MB_11 511 | 256 MB_12 | 256 MB_13 | 256 MB_14 | |
|  | ⋮ | ⋮ | ⋮ | ⋮ | |
|  | 2048 MB_88 | 2048 MB_89 | 2048 MB_90 | 2048 MB_91 | |
|  | 2304 MB_4 | 2304 MB_5 | 2304 MB_6 | 2304 MB_7 | |
|  | 2560 MB_15 | 2560 MB_16 | 2560 MB_17 | 2560 MB_18 | |
|  | ⋮ | ⋮ | ⋮ | ⋮ | |
|  | 4352 MB_92 | 4352 MB_93 | 4352 MB_94 | 4352 MB_95 | |
|  | 4608 MB_8 | 4608 MB_9 | 4608 MB_10 | | |
|  | 4864 MB_19 | 4864 MB_20 | 4864 MB_21 | | |
|  | ⋮ | ⋮ | ⋮ | | |
|  | 6656 MB_96 | 6656 MB_97 | 6656 MB_98 | | |

Fig. 4

| | B1 | B2 | B3 | B4 | B1 | |
|---|---|---|---|---|---|---|
| | 0<br>MB_0<br>  255 | 0<br>MB_1 | 0<br>MB_2 | 0<br>MB_3 | 2304<br>MB_4 | ... |
| | 256<br>MB_11<br>  511 | 256<br>MB_12 | 256<br>MB_13 | 256<br>MB_14 | 2560<br>MB_15 | ... |
| DEC_B | MB_22 | MB_23 | MB_24 | MB_25 | MB_26 | ... |
| | MB_33 | MB_34 | MB_35 | MB_36 | MB_37 | ... |
| | ... | ... | ... | ... | ... | ... |

100

MEMORY STRUCTURES AND METHODS FOR VIDEO CODEC

PRIORITY STATEMENT

This application claims priority from Korean Patent Application No. 10-2007-0019790, filed on Feb. 27, 2007, in the Korean Intellectual Property Office (KIPO), the entire contents of which are incorporated herein by reference.

BACKGROUND

1. Field

Example embodiments relate to video data processing systems. Also, example embodiments relate to memory structures and/or accessing methods for video codec systems.

2. Description of Related Art

Compression coding and decoding technologies for motion picture signals are useful for sparing memory capacity in storing images, as well as enabling motion pictures to be transmitted through low-rate channels. Those compression coding and decoding technologies are now regarded as highly important in multimedia industries requiring several applications such as storage and transmission of motion pictures. In the meantime, to achieve compatibility of video information and extension of multimedia industry, the necessity of standardization for information compression has been rising until even now by accompanying with various applications on the industrial field of motion pictures.

There have been practical efforts for systemizing the global standards of motion pictures sprightly over the word, such that International Telecommunication Union-Telecommunication Standard Sector (ITU-T) established H.261 and H.263+ as the standards for serving motion pictures in the environment of wired/wireless communication, and International Standardization Organization (ISO) also provided motion picture standards such as MPEG-1, MPEG-2, and MPEG-4, where MPEG means 'Motion Picture Experts Group'. With the rapid spread of radio communications since the developments of H.263+ and MPEG-4 standards, it was required to assure compression efficiency more enhanced than the conventional method and provide a technical specification for motion picture compression capable of accepting various communicating environments. Accordingly, ITU-T announced a 'Request for Technical Proposal' that is called H.26L specified in the next generation coding scheme, for which there were active studies by various-sized enterprises, institutes, and academic circles. Since that, the MPEG of ISO/IEC (International Electrotechnical Commission) entered the H.26L project in 2001. Thereby, ITU-T admitted the standard H.264 in May 2003 and then finally approved it as MPEG-4 Part 10 at ISO/IEC in August 2003.

The motion picture compression standard H.264 jointly established by ITU-T and ISO has been more advanced than the traditional standards such as MPEG-2 and MPEG-4 (Part 2) in flexibility to various network circumstances and efficiency of coding motion pictures. According to the estimation of engineers who participated in the standardization and implementation of motion pictures, it is regarded that the data compression rate by H.264 is 2~3 times of MPEG-2 used in a current digital versatile disc (DVD) system, and higher than MPEG-4 by 1.5~2 times. By the technology of H.264, it is possible to obtain image quality as same as DVD in a coding rate about 2 Mbps, or the same as home video cassette recorder (VCR) in a coding rate about 1 Mbps.

By applying the technology of H.264 to practical products and communication services, it greatly improves data transmission rate with reducing required image data capacity. While MPEG-2 is used in digital broadcastings and MPEG-4 is used in transmitting images of mobile phones, H.264 is expected to be used in applications needed to have higher compression rates above all.

In a general motion picture coding scheme, motion estimation and compensation is carried out in the unit of pixels of a predetermined volume size, i.e., a unit aggregation (M*N) composed by M horizontal pixels and N vertical pixels, instead of the unit of the whole image. Such a unit aggregation of pixels is called 'macroblock'. In a general motion picture coding scheme, the macroblock is sized by 16 horizontal pixels and 16 vertical pixels (16*16).

Meanwhile, in the next generation motion picture compression technology, motion estimation and compensation is carried out in a smaller unit aggregation of pixels. A mode type of macroblock is determined in the range of sizes including 16*16, 16*8, 8*16, and 8*8. The 8*8 mode includes the sub-mode types of 8*4, 4*8, and 4*4. Therefore, if a block size of one macroblock is all in the 4*4 unit, it permits 16 motion vectors at maximum and needs to conduct motion estimation and compensation by block.

A typical way of encoding input motion picture data is to estimate pixel data of a current frame after storing pixel data of the previous frame in a memory. With higher resolution of motion pictures, it is trending toward the scheme that pixel data of the previous frame is stored in a memory out of a video codec and loaded into the video codec if there is a need to be used. Because of that, a memory bandwidth between the memory (i.e., an external memory) and the video codec is an important factor to performance of a motion picture processing system.

SUMMARY

Example embodiments are directed to memory structures and methods capable of improving memory bandwidth between external memory and a video codec system.

Example embodiments are directed to memory devices for storing a plurality of macroblocks, each formed of m*n pixel data (m and n are positive integers), including: a plurality of memory banks storing the pixel data. Each memory bank may be sized to store rows of m pixel data.

According to example embodiments, a memory device for storing a plurality of macroblocks may include a plurality of memory banks. Each macroblock may include m*n pixel data, wherein m is a positive integer, and wherein n also is a positive integer. The plurality of memory banks may be adapted to store the pixel data. Each memory bank may be sized to store rows of m pixel data.

According to example embodiments, an image processing system may include: a memory adapted to store a plurality of macroblocks; and/or a video codec. Each macroblock may include m*n pixel data, wherein m is a positive integer, and wherein n also is a positive integer. The memory may include a plurality of memory banks. Each memory bank may be sized to store rows of m pixel data. The video codec may be adapted to encode pixel data read from the memory. The video codec also is adapted to decode the pixel data read from the memory.

According to example embodiments, a method of processing pixel data by accessing a memory device for storing a plurality of macroblocks (wherein each macroblock includes m*n pixel data, wherein m is a positive integer, wherein n also is a positive integer, wherein the memory device includes a plurality of memory banks, and wherein each memory bank is sized to store rows of m pixel data) may include: storing groups of up to k*y macroblocks of a frame in k memory banks of the memory device in a raster scanning order; and/or reading the pixel data of nine macroblocks from the k memory banks in an encoding mode, wherein k also is a positive integer, wherein x also is a positive integer, and wherein y also is a positive integer. The frame may include x*y macroblocks. The nine macroblocks may include a first macroblock and eight other macroblocks adjacent to the first macroblock.

BRIEF DESCRIPTION OF THE DRAWINGS

The above and/or other aspects and advantages will become more apparent and more readily appreciated from the following detailed description of example embodiments taken in conjunction with the accompanying drawings, in which:

FIG. 2B shows the pixel data of the one frame of FIG. 2A stored in four memory banks according to example embodiments;

FIG. 4 shows pixel data read from the external memory by the video codec of FIG. 1 in a decoding mode according to example embodiments.

DETAILED DESCRIPTION OF EXAMPLE EMBODIMENTS

Figure 1:
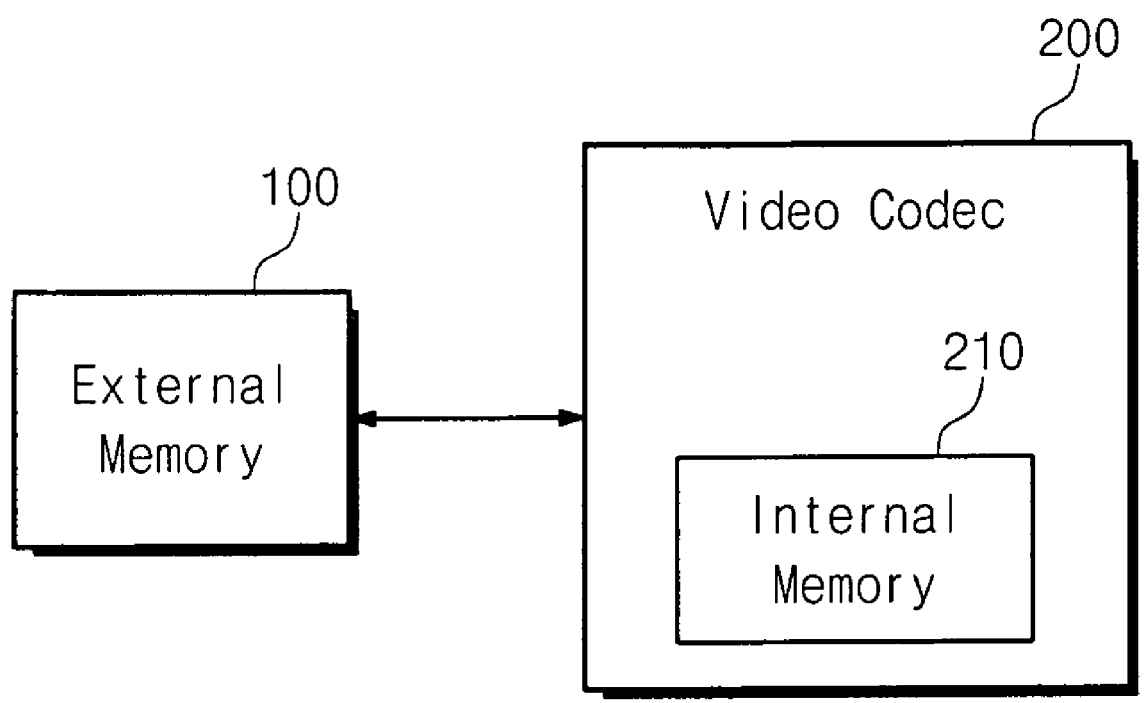
FIG. 1 is a diagram of an image processing system according to example embodiments.

Example embodiments will now be described more fully with reference to the accompanying drawings. Embodiments, however, may be embodied in many different forms and should not be construed as being limited to the embodiments set forth herein. Rather, these example embodiments are provided so that this disclosure will be thorough and complete, and will fully convey the scope to those skilled in the art. In the drawings, the thicknesses of layers and regions may be exaggerated for clarity.

It will be understood that when an element is referred to as being "on," "connected to," "electrically connected to," or "coupled to" to another component, it may be directly on, connected to, electrically connected to, or coupled to the other component or intervening components may be present. In contrast, when an element is referred to as being "directly on," "directly connected to," "directly electrically connected to," or "directly coupled to" another component, there are no intervening components present. As used herein, the term "and/or" includes any and all combinations of one or more of the associated listed items.

It will be understood that although the terms first, second, third, etc., may be used herein to describe various elements, components, regions, layers, and/or sections, these elements, components, regions, layers, and/or sections should not be limited by these terms. These terms are only used to distinguish one element, component, region, layer, and/or section from another element, component, region, layer, and/or section. For example, a first element, component, region, layer, and/or section could be termed a second element, component, region, layer, and/or section without departing from the teachings of example embodiments.

Spatially relative terms, such as "beneath," "below," "lower," "above," "upper," and the like may be used herein for ease of description to describe the relationship of one component and/or feature to another component and/or feature, or other component(s) and/or feature(s), as illustrated in the drawings. It will be understood that the spatially relative terms are intended to encompass different orientations of the device in use or operation in addition to the orientation depicted in the figures.

The terminology used herein is for the purpose of describing particular example embodiments only and is not intended to be limiting. As used herein, the singular forms "a," "an," and "the" are intended to include the plural forms as well, unless the context clearly indicates otherwise. It will be further understood that the terms "comprises," "comprising," "includes," and/or "including," when used in this specification, specify the presence of stated features, integers, steps, operations, elements, and/or components, but do not preclude the presence or addition of one or more other features, integers, steps, operations, elements, and/or components.

Unless otherwise defined, all terms (including technical and scientific terms) used herein have the same meaning as commonly understood by one of ordinary skill in the art to which example embodiments belong. It will be further understood that terms, such as those defined in commonly used dictionaries, should be interpreted as having a meaning that is consistent with their meaning in the context of the relevant art and should not be interpreted in an idealized or overly formal sense unless expressly so defined herein.

Reference will now be made to example embodiments, which are illustrated in the accompanying drawings, wherein like reference numerals may refer to like components throughout.

FIG. 1 is a diagram of an image processing system according to example embodiments.

Referring to FIG. 1, the image processing system may comprise an external memory 100 and/or a video codec (video coder/decoder) 200. The external memory 100 may store pixel data of a previous frame. In example embodiments, the external memory 100 may be a kind of synchronous dynamic random access memory (SDRAM).

The video codec 200 may include internal memory 210. The video codec 200 may read at least part of pixel data that is involved in a current macroblock, among pixel data of the previous frame stored in the external memory 100, for the purpose of encoding and/or decoding the current macroblock. Video codec 200 may store the read part of the pixel data (e.g., in internal memory 210) and then may begin the encoding and/or decoding process.

Figure 2A:
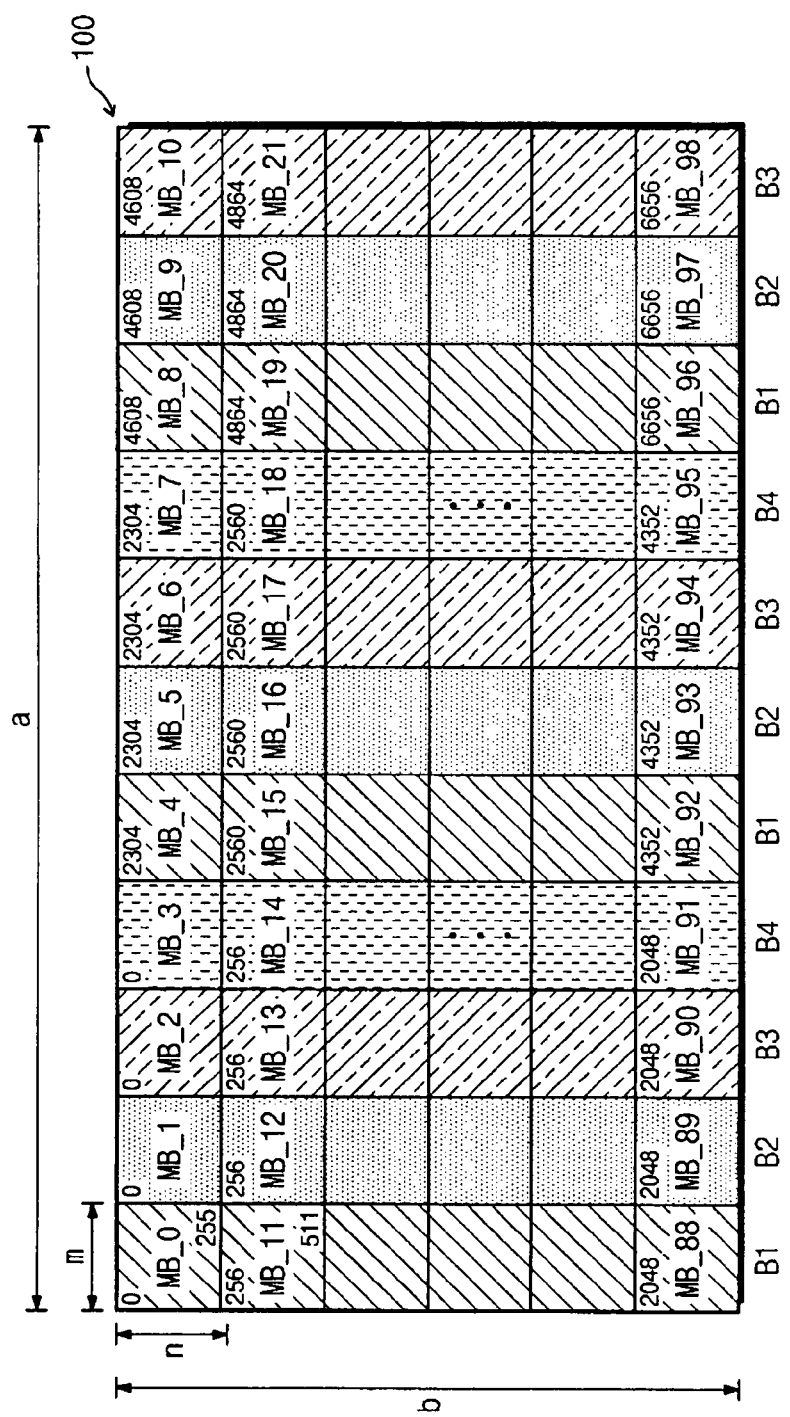
FIG. 2A shows pixel data of one frame stored in an external memory of FIG. 1 according to example embodiments.

FIG. 2A shows pixel data of one frame stored in the external memory 100 of FIG. 1 according to example embodiments.

Referring to FIG. 2A, each of macroblocks MB_0~MB_98 may be sized in rows that are n pixels high and columns that are m pixels wide. For example, m may be 16 and/or n may be 16. When m and n are both 16, then the macroblock may include 256 pixels (i.e., m*n=16*16=256).

As seen from FIG. 2A, a frame may be sized so that it has y rows of macroblocks, each n pixels high, and x columns of macroblocks, each m pixels wide. For example, y may be 9 and/or x may be 11. When y is 9 and x is 11, then the frame may include 99 macroblocks (i.e., x*y=11*9=99). Thus, the frame may be 144 pixels high and 176 pixels wide (i.e., b=n*y=16*9=144 and a=m*x=16*11=176). In this case, the frame may include 176*144=25,344 pixels.

As shown in FIG. 2A, for example, one or more columns of external memory 100 may be sized to store m*n*y pixel data. Thus, if m=16, n=16, and y=9, then m*n*y=2,304 pixels.

The external memory 100 may include two or more memory banks. As shown in FIGS. 2A and 2B, for example, the external memory 100 may include four memory banks B1~B4. One or more of the memory banks B1~B4 may have a size capable of storing pixel data of macroblocks belonging to one column of the frame. In other words, one or more of the memory banks B1~B4 may have a capacity of m*n*y pixel data (if m=16, n=16, and y=9, then m*n*y=2,304 pixels). In another example, each of the memory banks B1~B4 may have a size capable of storing pixel data of macroblocks belonging to one column (i.e., m*n*y pixel data). In yet another example, one or more (or each) of the memory banks B1~B4 may be sized to hold exactly m*n*y pixel data.

In addition or in the alternative, the two or more memory banks of external memory 100 may be sized to store m pixels of data in a row of at least one of the memory banks (or each memory bank). In addition or in the alternative, the two or more memory banks of external memory 100 may be sized to store rows of m pixel data in at least one of the memory banks (or each memory bank).

In FIG. 2A, numbers marked in the upper left corner of the macroblocks denote addresses in which the first pixel data of the macroblock may be stored. For example, as the macroblock MB_0 may include 16*16=256 pixels, the pixel data of macroblock MB_0 may be stored in a raster scanning order from the 0'th address to the 255'th address in the memory bank B1. Similarly, pixel data of the macroblock MB_11 may be stored in the raster scanning order from the 256'th address to the 511'th address in the memory bank B1, pixel data of the macroblock MB_22 may be stored in the raster scanning order from the 512'th address to the 767'th address in the memory bank B1, . . . , and pixel data of the macroblock MB_88 may be stored in the raster scanning order from the 2048'th address to the 2303'rd address in the memory bank B1.

With respect to FIG. 2A, for example, one or more of the memory banks B1~B4 may be sized to store m*n*y pixel data. Thus, if m=16, n=16, and y=9, then m*n*y=2,304 pixels. In another example, each of the memory banks B1~B4 may be sized to store m*n*y pixel data.

FIG. 2B shows the pixel data of the frame of FIG. 2A stored in the four memory banks B1~B4 according to example embodiments. First, pixel data of thirty-six (4*9) macroblocks (MB_0, MB_1, MB_2, MB_3, MB_11, MB_12, MB_13, MB_14, MB_22, MB_23, MB_24, MB_25, MB_33, MB_34, MB_35, MB_36, MB_44, MB_45, MB_46, MB_47, MB_55, MB_56, MB_57, MB_58, MB_66, MB_67, MB_€, MB_69, MB_77, MB_78, MB_79, MB_80, MB_88, MB_89, MB_90, and MB_91) may be stored in the memory banks B1~B4 in the raster scanning order. Second, another thirty-six (4*9) macroblocks (MB_4, MB_5, MB_6, MB_7, MB_15, MB_16, MB_17, MB_18, MB_26, MB_27, MB_28, MB_29, MB_37, MB_38, MB_39, MB_40, MB_48, MB_49, MB_50, MB_51, MB_59, MB_60, MB_61, MB_62, MB_70, MB_71, MB_72, MB_73, MB_81, MB_82, MB_83, MB_84, MB_92, MB_93, MB_94, and MB_95) may be stored in the memory banks B1~B4 in the raster scanning order. Third, another twenty-seven (3*9) macroblocks (MB_8, MB_9, MB_10, MB_19, MB_20, MB_21, MB_30, MB_31, MB_32, MB_41, MB_42, MB_43, MB_52, MB_53, MB_54, MB_63, MB_64, MB_65, MB_74, MB_75, MB_76, MB_85, MB_86, MB_87, MB_96, MB_97, and MB_98) may be stored in the memory banks B1~B3 in the raster scanning order. In this manner, pixel data of the macroblocks MB_0~MB_98 corresponding to one frame may be stored in the four memory banks B1~B4.

In example embodiments, when external memory 100 comprises k memory banks (k is a positive integer), groups of up to k*y macroblocks (which includes groups of k*y macroblocks) of the frame may be stored in the k memory banks in the raster scanning order. In addition or in the alternative, the x*y macroblocks of the frame may be stored in the k memory banks in groups of up to key macroblocks (which includes groups of k*y macroblocks). In addition or in the alternative, the m*n pixel data of each macroblock may be stored in a corresponding memory bank in the raster scanning order.

A "ceiling function" takes a numerical argument value and returns the smallest integer greater than or equal to the numerical argument value. It may be denoted, for example, by ceiling(x/k). If x=11 and k=4, then x/k=2.75 and ceiling(x/k)=3; if x=12 and k=4, then x/k=3 and ceiling(x/k)=3; and if x=13 and k=4, then x/k=3.25 and ceiling(x/k)=4.

As shown in FIG. 2B, for example, one or more of the memory banks B1~B4 may have a size capable of storing pixel data of macroblocks belonging to more than one column (e.g., ceiling(x/k) columns). For example, one or more of the memory banks B1~B4 may have a capacity of m*n*y*ceiling (x/k) pixel data (if m=16, n=16, x=11, y=9, and k=4, then m*n*y*ceiling(x/k)=6,912 pixels). In another example, each of the memory banks B1~B4 may have a size capable of storing pixel data of macroblocks belonging to more than one column (e.g., m*n*y*ceiling(x/k) pixel data, 2*m*n*y pixel data, 3*m*n*y pixel data, 4*m*n*y pixel data, etc.). In yet another example, one or more (or each) of the memory banks B1~B4 may be sized to hold exactly m*n*y*ceiling(x/k) pixel data (or 2*m*n*y pixel data, 3*m*n*y pixel data, 4*m*n*y pixel data, etc.).

Figure 3:
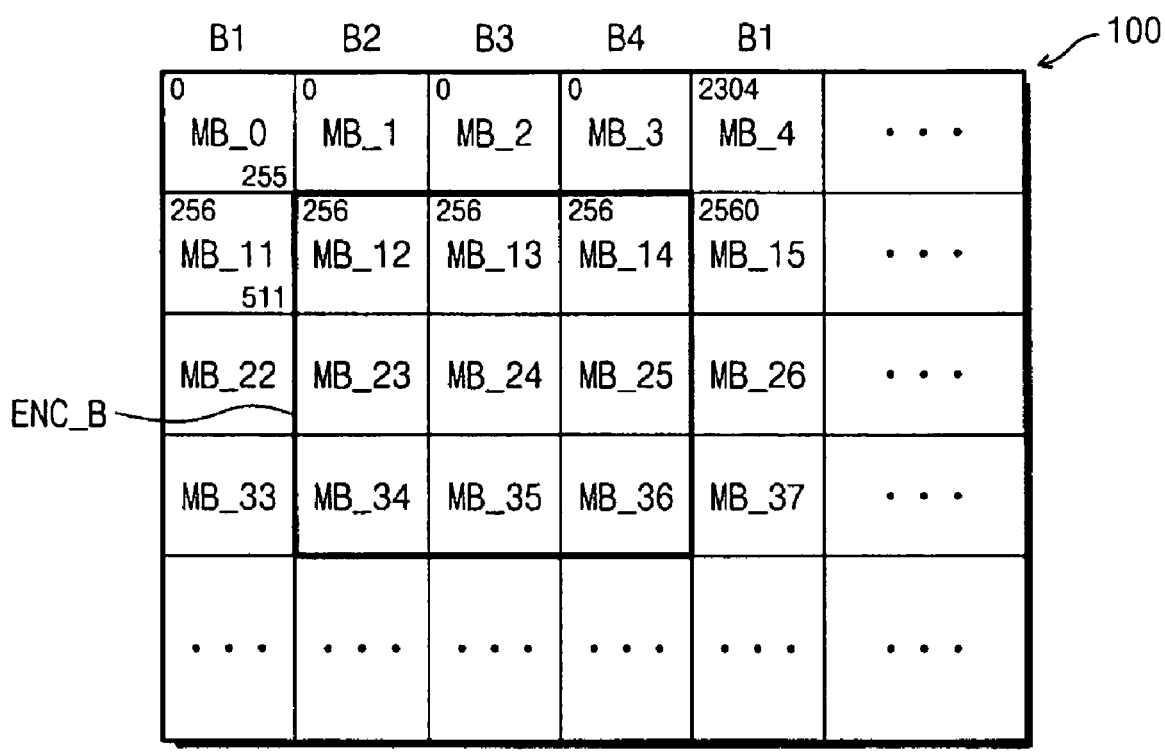
FIG. 3 shows macroblocks read from the external memory by the video codec of FIG. 1 in an encoding mode according to example embodiments.

FIG. 3 shows macroblocks read from the external memory 100 by the video codec 200 of FIG. 1 in an encoding mode according to example embodiments.

The video codec 200 may operate to encode pixel data of a current frame with reference to pixel data of one or more previous frames and/or the current frame in an encoding mode.

There exist a number of motion-estimation algorithms, and one or more differences exist between them. But it is basically necessary for an encoding process of a macroblock to consider a plurality of pixel data around the macroblock. In example embodiments, a search range for motion estimation may be confined to, for example, 16 pixels.

Referring to FIG. 3, in the encoding mode for estimating motion of the macroblock MB_24, the video codec 200 may read pixel data of the nine macroblocks MB_12~MB_14, MB_23~MB_25, and MB_34~MB_36 from the external memory 100. In example embodiments, the nine macroblocks, MB_12~MB_14, MB_23~MB_25, and MB_34~MB_36 may be referred to as an encoding block ENC_B as a whole.

The video codec 200 may access pixel data in a sequence, for example, from the memory bank B2 to the memory bank B4, in order to read the encoding block ENC_B. However, there may be several ways for reading pixel data of the encoding block ENC_B. In example embodiments, the video codec 200 may transfer a read command, an address designating a starting position of pixel data of one of the macroblocks (e.g., macroblock MB_12), and/or burst length information to the external memory 100. A memory controller (not shown) of the external memory 100 may output pixel data from the encoding block ENC_B to the video codec 200 in response to the read command, the address, and/or the burst length information.

First, the memory bank B2 of the external memory 100 may be accessed to read pixel data from the macroblocks MB_12, MB_23, and MB_34 in the raster scanning order. Second, pixel data of the macroblocks MB_13, MB_24, and MB_35 may be read in the raster scanning order. Third, pixel data of the macroblocks MB_14, MB_25, and MB_36 may be read in the raster scanning order. In example embodiments, memory banks B2, B3, and B4 of external memory 100 may be accessed to read pixel data from the nine macroblocks in any order. In addition or in the alternative, pixel data may be read in the raster scanning order from the nine macroblocks MB_12, MB_13, MB_14, MB_23, MB_24, MB_25, MB_34, MB_35, and MB_36 in any order of the macroblocks.

Thus, pixel data of the encoding block ENC_B, which includes the nine macroblocks MB_12~MB_14, MB_23~MB_25, and MB_34~MB_36, may be read in response to the read command. In particular, if the three macroblocks MB_12, MB_23, and MB_34; MB_13, MB_24, and MB_35; or MB_14, MB_25, and MB_36; stored in a memory bank, are included in a same page, it may be possible to remove latency by automatically generating row addresses from the external memory 100 without introducing the row addresses from another source. Additionally, although there is a latency cycle at the beginning of access to the memory bank B2 after completing the access to the memory bank B1, it may be hidden by an interleaving operation between the memory banks.

Therefore, the structure of the external memory 100 may be useful for increasing memory bandwidth between the external memory 100 and the video codec 200, improving performance of the motion picture processing system.

FIG. 4 shows pixel data read from the external memory 100 by the video codec 200 of FIG. 1 in a decoding mode according to example embodiments.

The video codec 200, in the decoding mode for a current frame, may generate a motion vector and/or may read pixel data of one or more previous frames from the external memory 100 in accordance with the motion vector. A position of pixel data to be read from the external memory 100, for decoding a macroblock of the current frame, may vary in accordance with the motion vector. Further, according to characteristics of the video codec 200, a size of pixel data read from the external memory 100 may vary in a range from a minimum, for example, of 9 (3*3) pixels to a maximum, for example, of 441 (21*21) pixels. For example, if a pixel data size necessary for the decoding mode by the video codec 200 is 21*21, as shown in FIG. 4, a decoding block DEC_B may include nine macroblocks at maximum.

Referring to FIG. 4, the memory bank B1 may be first accessed to at least partly read pixel data from the macroblock MB_0. Next, the memory bank B2 may be accessed to at least partly read pixel data from the macroblock MB_1. And the memory bank B3 may be accessed to at least partly read pixel data from the macroblock MB_2. In the same manner, pixel data of the nine macroblocks MB_0, MB_1, MB_2, MB_11, MB_12, MB_13, MB_22, MB_23, and MB_24 in the decoding block DEC_B may be read or at least partly read.

After access to the macroblock MB_0 of the memory bank B1, latency may be generated for low activation when the macroblock MB_1 of the memory bank B2 is being accessed. And, after access to the macroblock MB_1 of the memory bank B2, latency may be generated for low activation when the macroblock MB_2 of the memory bank B3 is being accessed. The latency generated during this process may be partially hidden by an interleaving operation between the memory banks. And, with the open page mode of SDRAM, if the memory bank B1 continues to be in an active state after completing access to the macroblock MB_1 of the memory bank B2, there may be no latency in accessing the macroblock MB_11 of the memory bank B1, even after completing access to the macroblocks MB_1 and MB_2.

In addition, if the three macroblocks, MB_0, MB_11, and MB_22; MB_1, MB_12, and MB_23; or MB_2, MB_13, and MB_24; in a same memory bank are included in a same page, there may be no need of low activation. For example, given a starting address of the decoding block DEC_B and a burst length, the external memory 100 may output pixel data while sequentially increasing a value of the row address.

As discussed above, the structure of the external memory 100 may be helpful for increasing memory bandwidth by minimizing latency between the external memory 100 and the video codec 200, even in the decoding mode.

Example embodiments may be advantageous for enhancing memory bandwidth between an external memory and a video codec in a motion picture processing system.

While example embodiments have been particularly shown and described, it will be understood by those of ordinary skill in the art that various changes in form and details may be made therein without departing from the spirit and scope of example embodiments as defined by the following claims.

What is claimed is:

1. A memory device for storing a plurality of macroblocks, the memory device comprising:
   a plurality of memory banks;
   wherein each macroblock includes m*n pixel data,
   wherein m is a positive integer,
   wherein n is a positive integer,
   wherein the plurality of memory banks is adapted to store the pixel data,
   wherein each memory bank is sized to store rows of m pixel data,
   wherein a frame includes x*y of the macroblocks,
   wherein x is a positive integer,
   wherein y is a positive integer,
   wherein the memory device comprises k of the memory banks,
   wherein k is a positive integer,
   wherein a $((h-1)+k*(i-1)+x*(j-1))$'th macroblock is stored in an h'th memory bank,
   wherein h=1, 2, . . . , k,
   wherein i=1, 2, . . . , ceiling(x/k),
   wherein j=1, 2, . . . , y,
   wherein $((h-1)+k*(i-1)+x*(j-1))$ is less than or equal to $x*y-1$, and
   wherein if more than one combination of h, i, j, k, and x gives a same value for $((h-1)+k*(i-1)+x*(j-1))$, then the $((h-1)+k*(i-1)+x*(j-1))$'th macroblock is stored in the h'th memory bank having a lower or lowest value of h.

2. The memory device of claim 1,
   wherein x is 11, and
   wherein y is 9.

3. The memory device of claim 1, wherein one or more of the memory banks is sized to store m*n*y pixel data.

4. The memory device of claim 1,
   wherein k is 2, 3, or 4.

5. The memory device of claim 1, wherein one or more of the memory banks is sized to store m*n*y*ceiling(x/k) pixel data.

6. The memory device of claim 1, wherein groups of up to k*y macroblocks of the frame are stored in the k memory banks in a raster scanning order.

7. The memory device of claim 1, wherein the x*y macroblocks of the frame are stored in the k memory banks in groups of up to k*y macroblocks.

8. The memory device of claim 1, wherein the m*n pixel data of each macroblock is stored in a corresponding one of the plurality of memory banks in a raster scanning order.

9. A synchronous dynamic random access memory, comprising the memory device of claim 1.

10. The memory device of claim 1, wherein x is 11,
wherein y is 9, or
wherein k is 2, 3, or 4.

11. An image processing system, comprising:
a memory adapted to store a plurality of macroblocks; and
a video codec;
wherein each macroblock includes m*n pixel data,
wherein m is a positive integer,
wherein n is a positive integer,
wherein the memory comprises:
 a plurality of memory banks;
wherein each memory bank is sized to store rows of m pixel data,
wherein the video codec is adapted to encode pixel data read from the memory,
wherein the video codec is adapted to decode the pixel data read from the memory,
wherein a frame includes x*y of the macroblocks,
wherein x is a positive integer,
wherein y is a positive integer,
wherein the memory comprises k memory banks,
wherein k is a positive integer,
wherein a ((h−1)+k*(i−1)+x*(j−1))'th macroblock is stored in an h'th memory bank,
wherein h=1, 2, . . . , k,
wherein i=1, 2, . . . , ceiling(x/k),
wherein j=1, 2, . . . , y,
wherein ((h−1)+k*(i−1)+x*(j−1)) is less than or equal to x*y−1, and
wherein if more than one combination of h, i, j, k, and x gives a same value for ((h−1)+k*(i−1)+x*(j−1)), then the ((h−1)+k*(i−1)+x*(j−1))'th macroblock is stored in the h'th memory bank having a lower or lowest value of h.

12. The image processing system of claim 11,
wherein x is 11, and
wherein y is 9.

13. The image processing system of claim 11,
wherein k is 2, 3, or 4.

14. The image processing system of claim 11, wherein groups of up to k*y macroblocks of the frame are stored in the k memory banks in a raster scanning order.

15. The image processing system of claim 11, wherein the x*y macroblocks of the frame are stored in the k memory banks in groups of up to k*y macroblocks.

16. The image processing system of claim 11, wherein the m*n pixel data of each macroblock is stored in a corresponding one of the plurality of memory banks in a raster scanning order.

17. The image processing system of claim 11, wherein x*y is greater than or equal to 9,
wherein in an encoding mode, the video codec reads from the memory the pixel data of nine macroblocks, and
wherein the nine macroblocks include a first macroblock and eight other macroblocks adjacent to the first macroblock.

18. The image processing system of claim 17, wherein k is greater than or equal to 3, and
wherein in the encoding mode, the video codec reads from the memory the pixel data of the nine macroblocks from three of the memory banks by a sequence of the memory banks.

19. The image processing system of claim 11, wherein x*y is greater than or equal to 9,
wherein in a decoding mode, the video codec at least partly reads from the memory the pixel data of nine macroblocks, and
wherein the nine macroblocks include a first macroblock and eight other macroblocks adjacent to the first macroblock.

20. The image processing system of claim 19, wherein k is greater than or equal to 3, and
wherein in the decoding mode, the video codec at least partly reads from the memory the pixel data of the nine macroblocks from three of the memory banks by a sequence of the memory banks.

21. The image processing system of claim 11, wherein x is 11,
wherein y is 9, or
wherein k is 2, 3, or 4.

22. A method of processing pixel data by accessing a memory device for storing a plurality of macroblocks, wherein each macroblock includes m*n pixel data, wherein m is a positive integer, wherein n is a positive integer, wherein the memory device includes a plurality of memory banks, and wherein each memory bank is sized to store rows of m pixel data, the method comprising:
storing groups of up to k*y macroblocks of a frame in k memory banks of the memory device in a raster scanning order; and
reading the pixel data of nine macroblocks from the k memory banks in an encoding mode;
wherein k is a positive integer,
wherein x is a positive integer,
wherein y is a positive integer,
wherein the frame includes x*y macroblocks,
wherein the nine macroblocks include a first macroblock and eight other macroblocks adjacent to the first macroblock,
wherein storing groups of up to k*y macroblocks includes storing a ((h−1) +k*(i−1)+x*(j−1))'th macroblock in an h'th memory bank,
wherein h=1, 2, . . . , k,
wherein i=1, 2, . . . , ceiling(x/k),
wherein j=1, 2, . . . y,
wherein ((h−1)+k*(i−1)+x*(j−1)) is less than or equal to x*y−1, and
wherein if more than one combination of h, i, j, k, and x gives a same value for ((h−1)+k*(i−1)+x*(j−1)), then the ((h−1)+k*(i−1)+x*(j−1))'th macroblock is stored in the h'th memory bank having a lower or lowest value of h.

23. The method of claim 22, wherein k is greater than or equal to 3, and
wherein reading the pixel data includes reading the pixel data of the nine macroblocks from three of the k memory banks by a sequence of the memory banks.

24. The method of claim 22, further comprising:
at least partly reading the pixel data of the nine macroblocks from the k memory banks of the memory device in a decoding mode.

25. The method of claim 24, wherein k is greater than or equal to 3, and
wherein at least partly reading the pixel data in the decoding mode includes at least partly reading the pixel data of the nine macroblocks from three of the k memory banks by a sequence of the memory banks.

26. The method of claim 22, wherein one or more of the plurality of memory banks is sized to store m*n*y pixel data.

27. The method of claim 22, wherein one or more of the plurality of memory banks is sized to store m*n*y*ceiling(x/k) pixel data.

28. The method of claim 22, wherein x is 11, wherein y is 9, or
wherein k is 2, 3, or 4.

* * * * *